July 10, 1934.  J. W. DAWSON  1,966,235
CONTROL SYSTEM
Filed Jan. 7, 1932
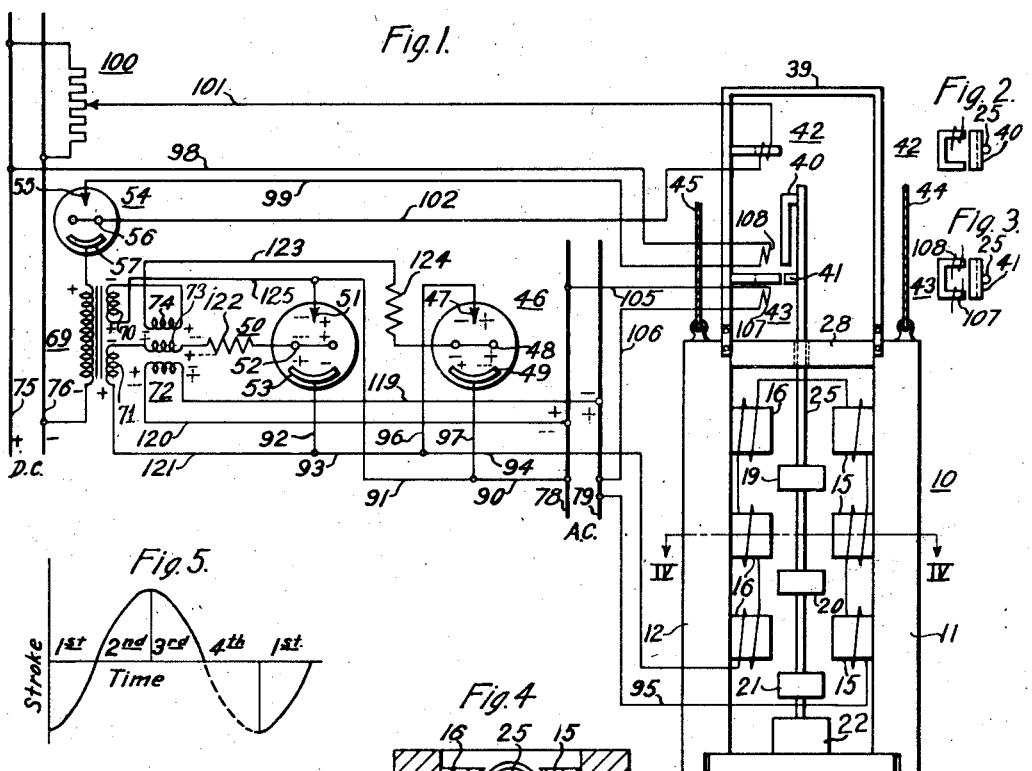
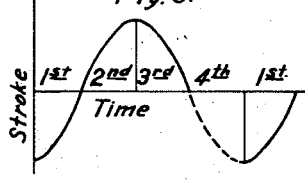
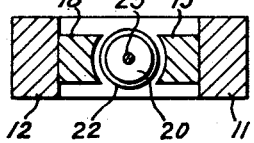
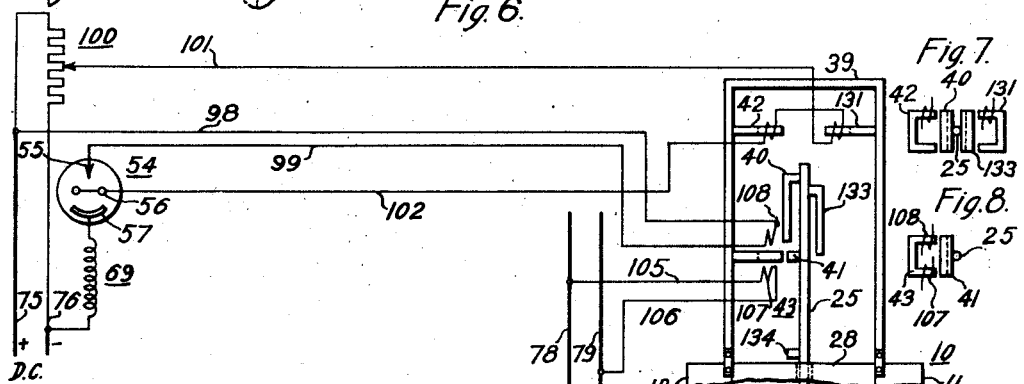
INVENTOR
John W. Dawson
BY W. R. Coley
ATTORNEY
WITNESSES:
Arthur J. McMahon
George V. Woodling Patented July 10, 1934

1,966,235

UNITED STATES PATENT OFFICE 1,966,235

CONTROL SYSTEM

John W. Dawson, Wilkinsburg, Pa., assignor to Westinghouse Electric & Manufacturing Company, a corporation of Pennsylvania Application January 7, 1932, Serial No. 585,203

12 Claims. (Cl. 172—240)

My invention relates, generally, to control systems and, more particularly, to control systems that may be utilized to control an electrically operating device having a working-cycle, such as an electric hammer and the like.

One object of my invention is to provide a control system of the class indicated that shall be simple and reliable in operation and be readily and economically manufactured and installed.

Another object of my invention is to provide for controlling the operations of an electrical device without utilizing mechanical engaging contact members for establishing the operating control circuits therefor.

It is also an object of my invention to provide for delivering current during a part only of the working cycle of an electrically operating device.

A more specific object of my invention is to provide for delivering current to an electrically operating device in accordance with the relative positions of a moving part of said device.

It is a further object of my invention to provide for causing a grid-glow tube, that controls the operations of an electrical operating device, to deliver current to said device during only a part of its working cycle.

Other objects of the invention will hereinafter become apparent.

For a fuller understanding of the nature and the objects of my invention reference may be had to the following detailed description, taken in connection with the accompanying drawing, in which:

Figure 1 is a diagrammatic view, which illustrates a control system embodying the features of my invention shown in connection with a translating device, Fig. 2 is a plan view of inductive means that is carried by said translating device, Fig. 3 is a plan view of a second inductive means that is carried by said translating device, Fig. 4 is a cross sectional view of said translating device taken, along the line IV—IV of Fig. 1, Fig. 5 represents a curve of the working cycle of the translating device, and indicates a portion of the cycle during which current is delivered to the translating device.

Fig. 6 is a diagrammatic view, showing a modified form of my control system wherein an additional inductive means is employed to modify the operations of the translating device.

Fig. 7 is a plan view of an inductive means that is carried by the translating device shown in Fig. 6.

Fig. 8 is a plan view of a second inductive means that is carried by the translating device shown in Fig. 6, and Fig. 9 is a curve of the work cycle of the translating device shown in Fig. 6, and indicates portions of the cycle during which current is delivered to the translating device.

The control circuit of Fig. 1 comprises, in general, a translating device 10 carrying an upper and lower inductive means 42 and 43, respectively, a grid-glow tube 54 controlled by said inductive means, and two power grid-glow tubes 46 and 50 which are governed by the grid-glow tube 54, together with the combined action of the transformers 69 and 72 which deliver current to the winding of said translating device.

The translating device 10 is shown somewhat diagrammatically, as my invention may be applied to a translating device of any conventional type. As illustrated, the translating device 10 comprises two spaced vertically disposed side members 11 and 12 which are joined together at their top by a member 28 and which are disposed at their lower end to engage a plunger 23 that may deliver work to an operating tool, for example, a pile driver. For the purpose of making a slidable working connection between the plunger 23 and the translating device 10, which is vertically suspended by cables 44 and 45 having sufficient slack that the said translating device 10 may recede with the plunger 23 each time that the armature hammer 22 delivers a blow to said plunger, the lower ends of the side members 11 and 12 are provided with a recess in which the head 24 of the plunger 23 may be slidably mounted. As is apparent, this connection allows the plunger 23, each time that it receives a hammer blow, to move downwardly, without carrying the translating device 10 along with it, and also permits said translating device, because of the slack in the suspending cables 44 and 45, to recede and rest upon the head 24 at the end of each succeeding blow of the armature hammer. Provided at spaced intervals on the inner sides of the vertically disposed members 11 and 12 are a plurality of pairs of magnetic poles 15 and 16, between which a reciprocating actuating rod 25, carrying a plurality of cooperating magnetic armatures 19, 20 and 21, and the hammer 22, is disposed.

For the purpose of obtaining the most efficient operation of translating devices for certain applications, I find that the windings that surround each of the magnetic poles should be energized during the first three quarters of the working cycle and deenergized during the fourth quarter-cycle.

That is to say, during the first quarter-cycle the magnetic flux that is passing between the pairs of poles lifts the cooperating armatures to points that coincide substantially mid-way between the face of the said poles; during the second quarter-cycle, because of the momentum acquired by the moving mass, the armatures tend to over-shoot, the said flux that is passing between the pairs of poles providing magnetic braking to limit the upward travel of said armatures; during the third quarter-cycle the armatures are attracted downwardly until they reach the said mid-way point between the face of the said poles; and then at this point, which is the beginning of the fourth quarter-cycle, the windings are deenergized to allow the downwardly moving masses to fall with full force and without magnetic braking.

For the purpose of controlling the operation of the mentioned electro-magnetic devices, I utilize a grid-glow tube 54 which is controlled by the inductive means 42 and 43 and which in turn control the operations of the power grid-glow tubes 46 and 50.

The upper inductive means 42 that is carried by the supporting member 39 comprises a substantially U-shaped magnetic core having a winding thereon and disposed with its open end adjacent to the travel of an inductor plate 40 that is carried at the upper extended end of the actuating rod 25. The lower magnetic means 43 that is carried by the supporting member 39 comprises a substantially U-shaped magnetic core having windings 107 and 108 thereon and disposed with its open end adjacent to the travel of an inductor bar 41. The inductor plate 40 and the inductor bar 41, during their translatory movement therefore, provide for controlling the actions of the grid-glow tube 54 to attain the desired operations.

As illustrated, the grid-glow tube 54 comprises an anode 55 and a cathode 57, which are generally called the principal electrodes, and a grid 56 associated therewith. In this connection, the grid of the grid-glow tube is effective only in preventing or initiating a glow-discharge between the principal electrodes, but is not effective in extinguishing or controlling the discharge after it is started, whereas the grid in a thermionic tube at all times maintains control over the current passing between the anode and the cathode.

In the operation of the grid-glow tube, a threshold discharge is initiated between the grid 56 and the cathode 57 when the grid potential, relative to the cathode potential, attains a predetermined value, depending upon the critical grid-to-cathode voltage characteristic of the tube. The cathode-to-grid threshold discharge, when once initiated, is self-supporting, and if sufficient voltage exists between the anode 55 and the grid 56, the said threshold discharge transfers to the anode 55, thus effecting a complete continuous discharge between the anode 55 and the cathode 57. Under this condition, the grid-glow tube 54 passes current between the principal electrodes thereof, and the said discharge continues to exist as long as the current passing between said electrodes does not decrease below the critical break-off value for the tube. In other words, if the potential of the grid 56, relative to the cathode 57, increases to, or above, the critical grid-to-cathode potential for initiating a discharge, and then decreases below the said critical grid-to-cathode potential, the said discharge continues to persist until the voltage between the principal electrodes decreases to, or below, a predetermined critical break-off value, such as it will when the voltage of alternating current passes through zero, or such as it will, in case direct current is utilized, when the said direct current is momentarily decreased or interrupted either by a vibrating interrupter (not shown) or by superimposing a voltage of the opposite polarity thereon, such as that produced by the inductive means 43. For this reason, since the grid-glow tube functions substantially as a very sensitive relay, it may be utilized to control the operations of the power grid-glow tubes 46 and 50.

The power grid-glow tubes 46 and 50, except for a greater current-carrying capacity, are similar to the grid-glow tube 54 and comprise, respectively, anodes 47 and 51, cathodes 49 and 53, and grids 48 and 52 associated therewith.

Power grid-glow tubes are generally divided into two main groups. The tubes of one of the groups comprise an oxide-filament cathode and may be filled either with one of the inert gases, such as neon, argon, or helium, or with mercury vapor, depending upon the service for which they are to be utilized. The tubes of the latter group employ as the negative electrode a pool of mercury similar to that of the well-known mercury vapor rectifier. In either construction, a power grid-glow tube acts as a rectifier, which means that two of such tubes must be utilized for the purpose of obtaining a full-wave rectification.

In explaining the operation of the control system in Fig. 1, let it be assumed that the alternating-current supply conductors 78 and 79, and the direct-current supply conductors 75 and 76 are, respectively, energized. Under this condition, the primary winding of the transformer 72 is energized from the alternating-current supply conductors 78 and 79, through conductors 119 and 120. Consequently, a voltage is induced, in the secondary windings 73 and 74 thereof, of such polarity as to bias the potential of the grids 52 and 48 towards the potential of their respective anodes 51 and 47. In this manner, since the voltage produced by the secondary windings 73 and 74 of the transformer is of a polarity to increase the grid-to-cathode potential to, or beyond, the critical grid-to-cathode potential, a glow-discharge is initiated between the principal electrodes 51 and 53 and 47 and 49, respectively. Therefore, when a glow-discharge persists within the grid-glow tubes 46 and 50, current flows, during the first half-cycle of the alternating current, from the supply conductor 78 through conductors 90 and 91, the principal electrodes 51 and 53 of the power grid-glow tube 50, conductors 92, 93 and 94, the illustrated windings of the translating device 10, and conductor 95 to the supply conductor 79.

On the other half-cycle of the alternating current, current flows from the supply conductor 79, through the conductor 95, the illustrated windings of the translating device 10, conductors 94 and 96, the principal electrodes 47 and 49 of the power grid-glow tube 46, and conductors 97 and 90 to the supply conductor 78. In addition, it is noted that the winding 107 of the inductive means 43 is directly connected across the alternating-current supply conductors 78 and 79 through conductors 105 and 106 for continuously energizing said inductive means.

As is usual with grid glow tubes, the important thing is the grid potential with reference to the potentials of the principal electrodes. To prevent any excessive currents from flowing through the grids when either tube 46 or 50 is operating, the grids 48 and 52 are provided with resistors 124 and 122, respectively. These resistors have a resistance value of considerable magnitude which may in some cases be more than a million ohms, thereby preventing any current from flowing through the grid.

To show that the proper potentials are provided for the various elements of the grid glow tubes and associated circuits, let it be assumed that for a given instant of operation that the conductor 78 is positive and the conductor 79 negative. Since the cathode 49 is connected directly to the conductor 78, there is no possibility of having power grid glow discharge tube 46 operating under the assumption. The anode 51 of power grid glow tube 50 is, however, connected to conductor 78 whereas the cathode 53 through the windings of translating device 10 is connected to the negative conductor 79, that is, anode 51 is positive and cathode 53 is negative. Power grid glow tube 50 will thus be conducting if the grid potential is either somewhere under zero or positive with reference to the cathode 53. The secondary windings 73 and 74 are in such a direction with reference to the primary winding 72 of the transformer connected directly to the conductors 78 and 79 that the grid potentials are of the correct value as desired. For instance, when the right hand terminal of primary 72 is negative as assumed, the right hand terminal 73 is positive and the right hand terminal of secondary 74 is positive.

For the next half of the cycle of the alternating current the potentials of the primary 72 will obviously reverse and in consequence the right hand terminal of secondary 73 will be negative and the right hand terminal of secondary 74 will be negative. For the second half of the cycle, cathode 49 will be negative whereas the cathode 53 will be positive. It will be thus apparent that grid 48 is positive and the power grid glow tube 46 is conducting for the negative portion of the wave of the alternating current taken from conductors 78 and 79.

The windings 107 and 108 being mounted on the same magnetic circuit are obviously equivalent to a transformer, thereby producing a pulsating current in the primary winding of the transformer 69 in addition to the direct current flowing therein when control grid glow tube 54 is conducting. The potentials of the secondaries 70 and 71 are thus in opposition to the potentials of the secondaries 73 and 74 for both the positive portion of the alternating current wave and the negative portion of the alternating current wave, thereby preventing the discharge tubes 46 and 50 from conducting when control grid glow tube 54 is conducting. The controlling effect of tube 54 will become more apparent from the detailed discussion given hereinafter.

Furthermore, it is noted that a direct-current potential persists across the primary electrodes 55 and 57 of the grid-glow tube 54. As illustrated, the anode 55 is connected to the positive supply conductor 75 through a circuit comprising a conductor 98, the winding 108 of the inductive means 43, and a conductor 99, and that the cathode 57 is connected to the negative supply conductor 76 through the primary winding of the transformer 69.

Also, as illustrated, the grid 56 of the grid-glow tube 54 is connected in circuit with a potentiometer 100, which is connected directly across the direct-current supply conductors 75 and 76, by means of a circuit comprising a conductor 102, the winding of the inductive means 42, and a conductor 101. In this connection, the resistor 100 is so adjusted that the potential existing between the grid 56 and the cathode 57 is below the critical break-down grid-to-cathode potential. Accordingly, the grid-glow tube 54 is normally disposed to pass no current unless disturbed by the inductive means 42 of the translating device 10.

When the armature rod 25 of the translating device 10 moves upwardly, as a result of the power grid-glow tubes 46 and 50 delivering current to the illustrated winding of said translating device, the upper end of the inductor plate 40, at the end of the first quarter-cyle of the working-cycle, coincides with the open end of the magnetic circuit of the inductive means 42 and, because of the change in reluctance thereof, induces a current in the winding thereof.

However, the said winding is so connected in circuit with the grid 56 of the grid-glow tube 54 that the polarity of the current induced therein is such as to bias the potential of the grid 56 nearer that of the potential of the cathode 57. As illustrated, the inductor plate 40 is of such length as not to pass beyond the open end of the inductive means 42 when the armature rod 25 reaches the upper end of its stroke. In this manner, the voltage induced in the winding of the inductive means 42, as the inductor plate 40 approaches and first coincides therewith, is of only one polarity by reason of the fact that the reluctance of the magnetic circuit of the said inductive means remains substantially constant for the remaining part of the upward stroke of the translating device 10. Consequently, no discharge is initiated within the said tube. By reason of the momentum acquired by the upwardly moving armature hammer, the armature continues to move upwardly until it reaches the end of the upper stroke, which is the end of the second quarter-cycle of the working cycle of the translating device. Therefore, it is noted that, during the second quarter-cycle, current is delivered to the winding of the translating device for establishing a magnetic braking effect in order to prevent the armature hammer from overshooting.

When the armature hammer reaches the end of its upper stroke, it is magnetically attracted downwardly and, when the upper end of the inductor plate 40 leaves the open ends of the U-shaped core of the inductive means 42, a voltage of the opposite polarity is induced in the winding thereof. As a result of this induced voltage, the potential of the grid 56, relatively to the potential of the cathode 57, is increased to, or above, the critical break-down grid-to-cathode potential and thus initiates a glow discharge between said principal electrodes.

Just as soon as a glow-discharge is established, direct-current from the supply conductors 75 and 76, together with an alternating current, that is superimposed thereon, passes between the principal electrodes 55 and 57 of the grid-glow tube 54 for energizing the primary winding of the transformer 69 which, in turn, extinguishes the glow-discharge of the power grid-glow tubes 46 and 50. This means that at the beginning of the fourth quarter-cycle of the working-cycle of the translating device 10, the current that flows to the illustrated winding of the translating device is interrupted.

In this connection, I wish to point out that the value of the alternating-current that is superimposed upon the direct current is such that the combined resultant voltage, at no time, is less than the critical break-off value of the grid-glow tube 54.

The circuit through which the direct-current flow may be traced extends from the positive supply conductor 75, through conductor 98, the winding 108 of the inductive means 43, conductor 99, the principal electrodes of the grid-glow tube 54, and the primary winding of the transformer 69 to the negative supply conductor 76. The alternating current that is superimposed upon the said direct-current is supplied by the winding 108 of the inductive means 43 and it flows from one terminal of the winding 108 through conductor 99, the primary electrodes of the grid-glow tube 54, the primary windings of the transformer 69, the negative supply conductor 76, the positive supply conductor 75, and conductor 98 to the opposite terminal of the winding 108 of said inductive means 43.

The value of the voltage induced in the winding 108 of the inductive means 43, when the inductor bar 41 is not coinciding therewith during the fourth quarter-cycle, is sufficient to induce a voltage, of such magnitude, in the secondary windings 70 and 71 of the transformer 69 as to bias the potential of the grids 52 and 48, respectively, towards the potential of their corresponding cathodes 53 and 49 until it decreases to, or below, the critical grid-to-cathode potential. When this critical potential is reached, the glow-discharge within the power tubes is extinguished just as soon as the alternating current passes through zero.

In other words, the voltage induced in the secondary winding 70 is of such value and polarity that it opposes the voltage induced in the secondary winding 74 for biasing the potential of the grid 48, relatively to the cathode 49, to, or below, the critical break-down grid-to-cathode voltage, and that the voltage induced in the secondary winding 71 is of such value and polarity that it opposes the voltage induced in the secondary winding 73 for biasing the potential of the grid 52, relatively to the cathode 53, to, or below, the critical break-down grid-to-cathode voltage. Therefore, when the upper end of the inductor plate 40 leaves the inductive means 42 on the downward stroke, the power grid-glow tubes 46 and 50 become inoperative and, accordingly, pass no current for energizing the illustrated windings of the said translating device during the fourth quarter-cycle of the working-cycle of the translating device. This allows the armature hammer to complete the downward stroke with full force and without being impeded or retarded by the magnetic action of the translating device.

However, when the downward stroke of the armature hammer is completed, the inductor bar 41 coincides with the inductive means 43 for extinguishing the glow-discharge of the tube 54, which, in turn, causes the power grid-glow tubes 46 and 50 to deliver current to the said translating device 10 for the next working cycle.

As is manifest, because of the reduced magnetic reluctance of the inductive means 43 when the inductor bar 41 coincides with the open end thereof, the voltage of the alternating current that is induced in the winding 108 is materially increased. Therefore, by reason of the increased value of the alternating-current voltage in the winding 108, the combined resultant voltage effect of the direct current and the alternating current that is traversing the primary winding of the transformer 69 is reduced to, or below, the critical break-off value of the said tube just as soon as the alternating-current wave passes through its maximum negative value. When the voltage passing between the anode 55 and the cathode 57 decreases to, or below the said critical break-off value, the glow-discharge is extinguished, thus causing the power grid-glow tubes 46 and 50 to become conducting to pass current to the illustrated windings of the transmitting device 10.

It will be readily understood that means other than the inductive means 43 may be employed to reduce the current that passes between the principal electrodes of the grid-glow tube 54 during the fourth quarter-cycle to, or below, the critical break-off value. To this end, an alternating-current may be superimposed upon the direct-current by connecting the secondary winding of a transformer (not shown) that may be directly energized from the supply conductors 78 and 79, in series circuit relation with the primary winding of the transformer 69. With this arrangement, the winding 107 of the inductive means 43 could be dispensed with and the "inductive kick" or momentary voltage induced in the winding 108, caused by the sudden change of reluctance, would, in this case, reduce the combined resultant effect of the direct-current and the alternating-current to, or below, the critical break-off value.

Each succeeding working-cycle of the translating device 10 is the same as that just previously described. The working-cycle for Fig. 1 is shown in Fig. 5, the full line indicating that the current is on during the first three quarter-cycles and the broken line indicating that the current is off during the fourth quarter-cycle.

In the modified form of my control system shown in Fig. 6, an additional inductive means 131 and an inductor plate 133 therefor, together with an inductor bar 134 that cooperates with the inductive means 43, is provided for operating the power grid-glow tubes 46 and 50 in such manner that current is delivered to the translating device 10 during the first, and a very small part of the second and third quarter-cycles, and off during the remaining part of the second and the whole of the fourth quarter-cycles of the working-cycle of said translating device (see Fig. 9), the full line indicating that the current is on and the broken line indicating that the current is off.

With a view to simplifying the drawing, I have shown only such part of the modified form of my control system which relates to the modification, because the remaining parts thereof are the same as that shown in Fig. 1, and like reference characters represent like parts.

As illustrated, the winding of the inductive means 131 is so connected in relation to the windings of the inductive means 42 that the voltage induced therein is of opposite polarity to the voltage induced in the inductive means 42.

In the operation of the control system in Fig. 6, the inductor bar 40 during the upward stroke of the armature hammer approaches, and coincides with, the inductive means 42 in the same manner as previously described for Fig. 1, that is the polarity of the voltage induced in the winding thereof is such as not to effect the grid-glow tube 54, but as the inductor plate 133, which is disposed slightly below the inductor plate 40, and on the opposite side of the extended end of the armature rod 25 approaches, and coincides with, the inductive means 131, a voltage of such value and polarity is induced therein as to establish a glow-discharge in the grid-glow tube 54. This action occurs slightly after the beginning of the second quarter-cycle, as the inductor plate 133 is located slightly below the inductor plate 40. However, it is to be understood that the inductor plate 40 and 133 may be adjustable and thus so disposed relatively to each other as to give any desired operation. As hereinbefore explained, the grid-glow tube 54, in turn, extinguishes the glow-discharge of the power grid-glow tubes 46 and 50, with the result that they deliver no current to the translating device during the remaining part of the second quarter-cycle.

In this connection, I find in some applications, such as in large electric hammers for pile drivers and the like, it is desirable, since there is no danger of the armature hammer overshooting, not to impede the upward stroke of the armature hammer during all of the second quarter-cycle.

As illustrated, at the end of the upward stroke of the armature hammer, the inductor bar 134 coincides with the inductive means 43 for inducing a voltage of sufficient magnitude such that the combined resultant voltage effect of the direct current and the alternating current that is passing between the principal electrodes of the grid-glow tube 54 decreases to, or below, the break-off value of the said tube just as soon as the alternating current wave passes through its negative maximum value. This extinguishes the glow-discharge of the grid-glow tube 54 and, in turn, causes the power grid-glow tubes 46 and 50 to become conducting to deliver current to the illustrated windings of the transmitting device during the third quarter-cycle. Then, as hereinbefore explained, when the inductor plate 40 passes the inductive means 42, upon the downward stroke, a glow-discharge is established in the grid-glow tube 54 which, in turn, causes the power grid-glow tubes 46 and 50 to pass no current for deenergizing the translating device 10. In this connection, it is to be noted that the voltage induced in the inductive means 131 when the top end of the inductor plate 133 leaves said inductive means, on the downward stroke, is such as to cause no disturbance of the grid-glow tube 54.

Therefore, as illustrated in Fig. 9, the power is on during the first quarter-cycle, a small part of the second quarter-cycle, and the third quarter cycle; and off during the remaining part of the second quarter-cycle and the fourth quarter-cycle.

Therefore, I have shown different forms of a control system for controlling the operations of electrical operating devices without utilizing mechanically engaging contact members for establishing circuits for effecting said operation.

Since certain changes in my invention may be made without departing from the spirit and scope thereof, it is intended that all matters contained in the foregoing description and shown in the accompanying drawing shall be interpreted as illustrative and not in a limiting sense.

I claim as my invention:

1. In combination, a source of current, an electrical operating device having a moving part adapted to be operated by an electro-magnetic coil, inductive means disposed adjacent to the travel of said moving part and influenced thereby, an electric discharge-device responsive to the electrical condition of said inductive means, and control means controlled by said electric discharge-device for delivering current from said source to the electro-magnetic coil of said operating device, said control means being adapted to deenergize said electro-magnetic coil when the influenced condition of said inductive means causes said discharge device to function.

2. In combination, a source of current, an electrical operating device having a moving part adapted to be operated by an electro-magnetic coil, inductive means disposed in spaced relation adjacent to the travel of said moving part and influenced thereby, an electric discharge-device responsive to the electrical condition of said spaced inductive means, and control means controlled by said electric discharge-device for delivering current from said source to the electro-magnetic coil of said operating device, said control means being adapted to deenergize said electro-magnetic coil when the influenced condition of one of said inductive means causes said discharge-device to function and said control means being adapted to energize said electro-magnetic coil when the electrical condition of said other inductive means causes said discharge-device to cease functioning.

3. In combination, a source of current, an operating device having moving parts that are disposed in spaced relation, an electro-magnetic coil for actuating said device, an inductive means disposed adjacent to the travel of one of said moving parts and influenced thereby, a second inductive means disposed adjacent to the travel of said other moving part and influenced thereby, and an electric discharge device for controlling said coil connected in circuit with said inductive means and responsive to the influenced conditions thereof, the influenced condition of one of said inductive means being such as to cause said discharge device to function, and the influenced condition of said other inductive means being such as to cause said discharge-device to cease functioning.

4. In combination, a source of current, an operating device having a moving part energized by said source, an electro-magnetic coil for actuating said device, inductive means disposed in spaced relation adjacent to the travel of said moving part and influenced thereby, and an electric discharge device for controlling said coil connected in circuit with said inductive means and responsive to the influenced conditions thereof, the influenced condition of one of said inductive means being such as to cause said discharge-device to function, and the influenced condition of said other inductive means being such as to cause said discharge device to cease functioning.

5. In combination, a source of current, an operating device having a moving part energized by said source, inductive means disposed in spaced relation adjacent to the travel of said moving part and influenced thereby, an electric discharge device connected in circuit with said inductive means and responsive to the influenced conditions thereof, the influenced condition of one of said inductive means being such as to cause said discharge-device to function, and the influenced condition of said other inductive means being such as to cause said discharge-device to cease functioning, and means controlled by said discharge device for delivering current from said source to said operating device, said delivering means being interrupted to deenergize said operating device when the discharge device is functioning, and said delivering means being adapted to energize said operating device when said discharge-device ceases functioning.

6. In combination, a source of current, an operating device having moving parts that are disposed in spaced relation, an inductive means disposed adjacent to the travel of one of said moving parts and influenced thereby, a second inductive means disposed adjacent to the travel of said other moving part and influenced thereby, an electric discharge device connected in circuit with said inductive means and responsive to the influenced conditions thereof, the influenced condition of one of said inductive means being such as to cause said discharge device to function, and the inductive condition of said other inductive means being such as to cause said discharge device to cease functioning, and means controlled by said discharge device for delivering current from said source to said operating device, said delivering means being interrupted to deenergize said operating device when the discharge device is functioning, and said delivering means being conducting to energize said operating device when said discharge device ceases functioning.

7. In a translating device having an operating member, a solenoid for operating the member, and an armature mounted to operate with the member, in combination, a source of current, a plurality of electric discharge devices having a pair of principal electrodes and a grid associated therewith for controlling the energization of the solenoid, said principal electrodes being connected in circuit with said source of current, means associated with said source of current and said grid for causing the said discharge devices to pass current between said principal electrodes, a pilot electric discharge device having a pair of principal electrodes and a grid associated therewith controlled by said armature, a transformer connected in circuit with the principal electrodes of said pilot discharge device for causing the first of said mentioned discharge devices to pass substantially no current, means associated with said source of current for impressing a voltage across the principal electrodes of said pilot discharge device, means for causing said pilot discharge device to pass current for energizing said transformer, and means for causing said pilot discharge device to pass substantially no current.

8. In a translating device having an operating member, a solenoid for operating the member, and an armature mounted to operate with the member, in combination, a source of current, a pilot discharge device connected in circuit relation with said source and controlled by said armature, a plurality of electric discharge devices connected in circuit with said source and controlled by said pilot discharge device and adapted to control the energization of said solenoid, a transformer connected in circuit relation with the said pilot discharge device and the said second of said mentioned discharge devices, said transformer being adapted when energized from said source to effect the operation of said second of said mentioned discharge devices, and means for causing said pilot discharge device to pass current for energizing said transformer.

9. In a translating device having an operating member, a solenoid for operating the member, and an armature mounted to operate with the member, in combination, a source of current, a plurality of electric discharge devices connected in circuit with said source and adapted to control the energization of said solenoid, a pilot discharge device connected in circuit with said source, controlled by said armature, and disposed to control the operations of said first-mentioned discharge devices, a transformer energized from said source for causing the first-mentioned discharge devices to pass current, a second transformer connected in circuit with said pilot discharge device and said first-mentioned discharge devices, said second transformer being adapted when energized from said source to cause said first-mentioned discharge devices to pass substantially no current, and means for causing said pilot discharge device to pass current for energizing said second transformer.

10. In a translating device having an operating member, a solenoid for operating the member, and an armature mounted to operate with the member, in combination, a source of current, a plurality of electric discharge devices connected in circuit with said source and adapted to control the energization of said solenoid, a pilot discharge device controlled by said armature connected in circuit with said source and disposed to control the operations of said first-mentioned discharge devices, a transformer energized from said source for establishing a certain condition within the first-mentioned discharge devices, a second transformer connected in circuit with said pilot discharge device and said first-mentioned discharge devices, said second transformer being adapted when energized from said power source to change the condition established by said first-mentioned transformer in said first-mentioned discharge devices, and means for causing said pilot discharge device to pass current for energizing said second transformer.

11. In combination, a source of current, a plurality of electric discharge devices having a pair of principal electrodes and a control electrode, said principal electrodes being connected in circuit with said source, a pilot discharge device having a pair of principal electrodes and a control electrode, means associated with said source for impressing a voltage across the principal electrodes of said pilot discharge device, a transformer energized from said source for biasing the potential of the control electrodes relatively to the principal electrodes of the first-mentioned discharge devices, a second transformer connected in circuit with the principal electrodes of said pilot discharge device for biasing in the opposite direction the potential of the control electrodes relatively to the principal electrodes of the first-mentioned discharge devices, and means for causing said pilot discharge device to pass current for energizing said second transformer.

12. In combination, a source of current, an operating device having moving parts that are disposed in spaced relation, an inductive means disposed adjacent to the travel of one of said moving parts and influenced thereby, a second inductive means disposed adjacent to the travel of said other moving part and influenced thereby, a pilot electric discharge device having a pair of principal electrodes and a control electrode, the principal electrodes being connected in circuit with said second inductive means and the control electrode being connected in circuit with the first-mentioned inductive means, said second inductive means being energized from said source for impressing a potential across the principal electrodes of said pilot discharge device, a plurality of electric discharge devices having a pair of principal electrodes and a control electrode, said principal electrodes being connected in circuit with said source for delivering a current to said operating device, a transformer energized from said source for biasing the potential of the control electrodes relative to the principal electrodes of the second mentioned discharge devices, a second transformer connected in circuit with the principal electrodes of said pilot discharge device for biasing in the opposite direction the potential of the control electrodes relative to the principal electrodes of the second-mentioned discharge devices, means associated with the first-mentioned inductive means for initiating a glow-discharge in said pilot discharge device for passing current for energizing said second transformer when the said inductive means is influenced by its cooperative moving part, and means for extinguishing said glow-discharge when the second inductive means is influenced by its cooperative moving part.

JOHN W. DAWSON.